United States Patent [19]

Lashlee et al.

[11] Patent Number: 5,668,460
[45] Date of Patent: Sep. 16, 1997

[54] BATTERY RECHARGER TURNTABLE

[75] Inventors: Curtiss N. Lashlee; Ronald E. Starzl, both of Oxnard, Calif.

[73] Assignee: Lashstar, Inc., Oxnard, Calif.

[21] Appl. No.: 331,983

[22] Filed: Oct. 31, 1994

[51] Int. Cl.$^6$ .................................................. H01M 10/46
[52] U.S. Cl. ............................ 320/2; 320/15; 414/283; 104/34
[58] Field of Search ................... 320/2, 6, 15; 414/281, 414/282, 283, 284, 285, 286; 104/34

[56] References Cited

U.S. PATENT DOCUMENTS

| | | |
|---|---|---|
| 3,648,853 | 3/1972 | Winne . |
| 4,209,088 | 6/1980 | Sairto . |
| 4,291,797 | 9/1981 | Ewertowski . |
| 4,326,624 | 4/1982 | Ewertowski et al. . |
| 4,589,467 | 5/1986 | Hunter . |
| 4,674,784 | 6/1987 | Wooley . |
| 4,871,293 | 10/1989 | Cowles . |
| 4,953,488 | 9/1990 | Heidtmann ..................... 414/283 X |
| 4,998,858 | 3/1991 | Magens ......................... 414/282 X |
| 5,091,687 | 2/1992 | Meyer et al. ........................ 320/2 |

*Primary Examiner*—Edward Tso
*Attorney, Agent, or Firm*—Kelly Bauersfeld; Lowry & Kelley, LLP

[57] ABSTRACT

A turntable is provided for use in recharging batteries of the type used in battery powered forklift trucks and the like. The turntable includes a peripheral array of charging stations each including a support platform and a battery charger for connection to and recharging of a battery on the platform. The turntable is rotatably driven in a stepwise manner to index the charging stations in succession to a transfer position. A push-pull ram at the transfer position draws a depleted battery from a forklift truck onto the platform of an empty charging station. The turntable is then indexed to move a recharged battery to the transfer position, and the push-pull ram installs the recharged battery on the forklift truck.

10 Claims, 6 Drawing Sheets

BATTERY RECHARGER TURNTABLE

BACKGROUND OF THE INVENTION

This invention relates generally to a system and method for handling and recharging relatively large and heavy batteries of the type used in battery powered vehicles such as forklift trucks and the like. More particularly, this invention relates to battery recharger apparatus for quickly and safely removing a depleted battery from and installing a recharged battery on a forklift truck or the like, without requiring battery lifting during the transfer process.

Battery powered vehicles such as forklift trucks and the like are well-known for use in a wide variety of industrial and materials handling applications. Such battery powered vehicles are highly desirable for their substantially polution-free operation in comparison with similar vehicles powered by a combustion engine. A typical battery powered forklift truck includes a battery compartment for receiving a relatively large and heavy rechargeable battery having a sufficient charge to operate the vehicle for an extended period of time. The battery compartment is normally located at a relatively low center of gravity position, typically beneath the driver's seat. Such batteries commonly weigh on the order of 2,000 to 2,500 pounds.

Rechargeable batteries for forklift trucks and the like, as described above, have a normal operating cycle on the order of about five hours. As the battery reaches a depleted condition, it is necessary to connect the battery to a suitable recharger for a period of time which normally exceeds the operating cycle of the battery, with a typical recharging time being on the order of about eight hours. If battery recharging takes place without removing the depleted battery from the forklift truck, the vehicle is effectively removed from service during the recharging interval.

To enable the forklift truck or other battery powered vehicle to remain in service on a substantially continuous basis, a depleted battery is normally removed from the vehicle during the recharging interval and replaced with a charged battery. In the past, the battery transfer or exchange process has required hoist mechanisms for lifting a depleted battery from the vehicle and then transferring that depleted battery to a charger station. The hoist mechanism is then used to lift and transfer a recharged battery for installation on the vehicle. This lift and transfer process must be performed with great care to avoid accidental dropping of the heavy batteries.

There exists, therefore, a significant need for improvements in devices and methods for transferring depleted and recharged batteries with respect to a battery powered vehicle such as a forklift truck and the like. The present invention fulfills these needs and provides further related advantages.

SUMMARY OF THE INVENTION

In accordance with the invention, a battery recharger turntable is provided for use in handling and recharging batteries, particularly such as relatively large and heavy batteries of the type used in battery powered vehicles such as forklift trucks and the like. The turntable includes a plurality of battery charging stations each equipped with a battery charger. A transfer mechanism is provided for transferring a depleted battery from the vehicle to a charging station, and for transferring a recharged battery from another charging station for installation on the vehicle. The transfer mechanism moves the batteries without lifting between the charging stations and the vehicle.

In the preferred form, the turntable comprises a horizontally oriented frame with the charging stations disposed in a generally circular array about the turntable periphery. Each charging station includes a battery support platform for receiving and supporting a battery to be recharged, in combination with a battery charger. A depleted battery positioned on the platform of a charging station can be connected to the charger for recharging said battery.

The turntable is rotatably driven in a stepwise manner to index the charging stations in succession to a transfer position. A forklift truck or the like having a depleted or near-depleted battery is parked alongside the turntable adjacent said transfer position. The vehicle battery is disconnected from a drive motor for the vehicle, and the battery is laterally exposed for horizontal sliding removal from a vehicle battery compartment. Such exposure of the battery typically involves pivotal movement of a vehicle seat to an out-of-the-way position.

The transfer mechanism on the turntable comprises, in the preferred form, a push-pull ram at the transfer position. The push-pull ram includes a vacuum suction head for engaging a side wall of the depleted battery within the vehicle, and for vacuum-draw sliding movement of the depleted battery from the vehicle onto an empty support platform of a charging station at the transfer position. The suction head is then released from the battery, and the turntable is indexed to move another charging station carrying a recharged battery to the transfer position. The push-pull ram is then advanced to push the recharged battery from the charging station into the battery compartment of the adjacent vehicle. The recharged battery is reconnected to the vehicle drive motor, and the vehicle is returned to normal service. The turntable with the now-vacant charging station at the transfer position remains stationary, awaiting a subsequent vehicle with a depleted or near-depleted battery which is driven to and parked at the transfer position.

In accordance with further aspects of the invention, the support platforms of the battery charging stations include elevational adjustment means for vertically aligning the support platform at the transfer position with the floor of the battery compartment on the adjacent vehicle. The support platform is thus adjustable to ensure smooth sliding transfer of batteries between the vehicle and the turntable, without requiring battery lifting. The vacuum suction head of the push-pull ram includes a pivot connection to accommodate a range of vertical support platform adjustment subsequent to suction engagement with a depleted battery.

Other features and advantages of the present invention will become more apparent from the following detailed description, taken in connection with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, a battery recharger turntable referred to generally by the reference numeral 10 is provided for recharging batteries of the type used in battery powered vehicles such as a forklift truck 12 and the like. The turntable 10 includes a plurality of charging stations 14 each equipped with a battery charger 16 for connection to and recharging of a battery 18. In addition, the turntable 10 includes a transfer mechanism 20 for transferring depleted and recharged batteries between the turntable 10 and an adjacent vehicle 12, without requiring the batteries to be hoisted or lifted at any time.

The battery recharger turntable 10 of the present invention is particularly designed for handling and recharging relatively large and heavy batteries 18 of the type used to power a forklift truck 12 and the like in an industrial and/or materials handling environment. In this regard, as shown in FIGS. 2–6, such vehicles typically comprise a wheeled frame 22 with a battery compartment 24 disposed at a relatively low center of gravity position, typically beneath a seat 26 (FIG. 5) for the vehicle driver or operator. Heavy duty lead-acid batteries are commonly used in such vehicle applications, wherein the battery 18 is relatively large and heavy with a typical weight on the order of 2,000 to 2,500 pounds. During a normal battery life cycle, the battery 18 carries sufficient charge to operate the vehicle 12 for several hours, such as on the order of five hours. When the battery 18 reaches a depleted or near-depleted charge condition, it is necessary to connect the battery to a recharger for a period of several hours, typically about eight hours.

The present invention provides apparatus and method for quickly and safely exchanging a depleted battery 18 with a recharged battery, so that the vehicle 12 can be quickly returned to normal service. The depleted battery 18 is positioned at one of the charging stations 14, for connection to the battery charger 16 at that station, whereby the depleted battery is recharged and made available for return to service at a subsequent point in time.

Figure 3:
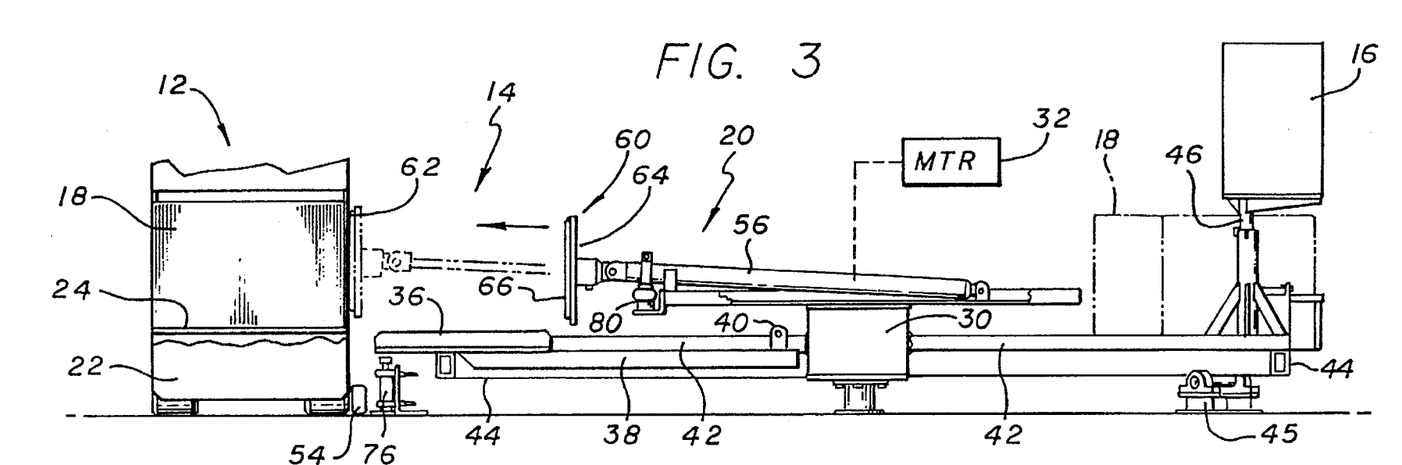
FIG. 3 is a transverse vertical sectional view taken generally on the line 3—3 of FIG. 2.
Figure 4:
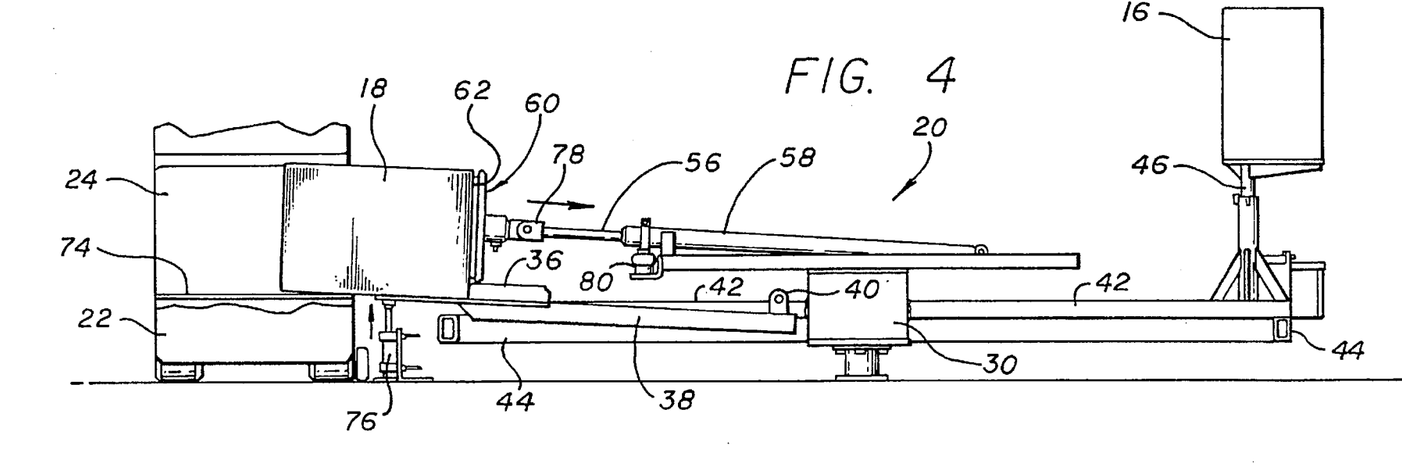
FIG. 4 is a vertical sectional view similar to FIG. 3, but illustrating vertical adjustment of a support platform for slidably receiving a battery to be recharged.
Figures 5, 6, 7:
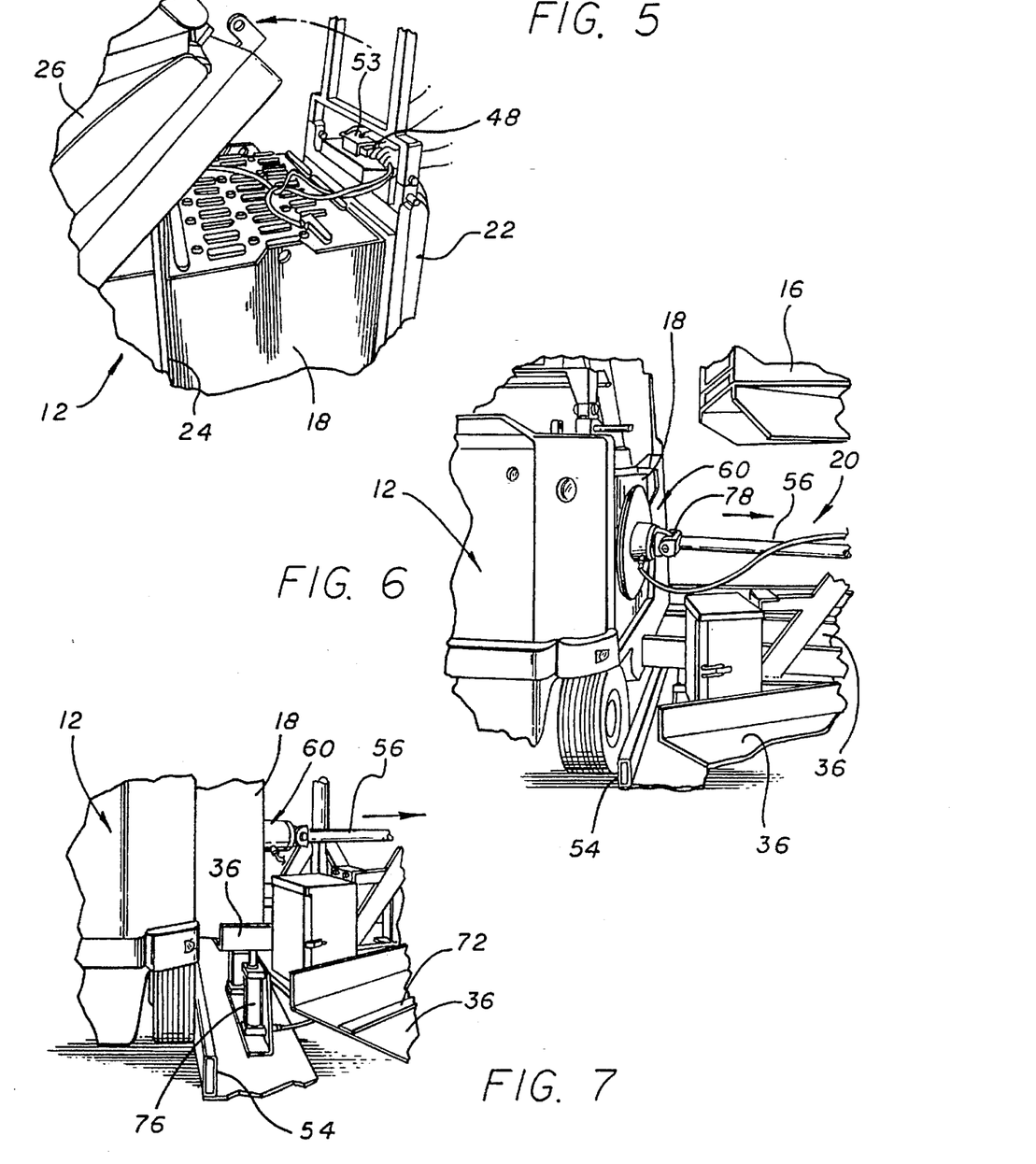
FIG. 5 is fragmented perspective view illustrating preparation of a battery within the storage compartment of a vehicle for slide transfer to the recharger turntable.
FIG. 6 is a fragmented perspective view showing initial engagement of a push-pull ram with a battery for vacuum-draw transfer of the battery to the turntable.
FIG. 7 is another fragmented perspective view depicting elevational adjustment of the battery support platform.

In general terms, the turntable 10 comprises a generally circular and horizontally oriented frame 28 carried by a central hub 30 for rotation about a central vertical axis. A drive motor 32 shown schematically in FIG. 3 is provided for rotatably driving the turntable 10, in response to an appropriate control unit 34 (FIG. 1), in a stepwise manner as will be described in more detail.

The charging stations 14 are arranged in a generally circular array about the periphery of the turntable frame 28, with a total of twelve equiangular disposed charging stations being shown in the illustrative drawings. Each charging station 14 includes a support platform 36 having a size and shape sufficient to receive and support one of the batteries 18. The support platform 36 is carried at the outer end of a support beam 38, the inner end of which is connected by a pivot pin 40 or the like to the turntable frame 28 at a location near the hub 30. As shown, the pivot pin 40 connects the support beam 38 with respect to an outwardly radiating pair of frame beams 42, the outer ends of which are secured as by welding to a rigid frame rim 44. In a normal position, the support platform 36 is vertically rested on the frame rim 44, but the pivot pin 40 accommodates at least some elevational adjustment of the support platform 36, the details of which will be further described herein. During turntable rotation, the rim 44 is rollingly supported on bearings 45.

Figure 12:
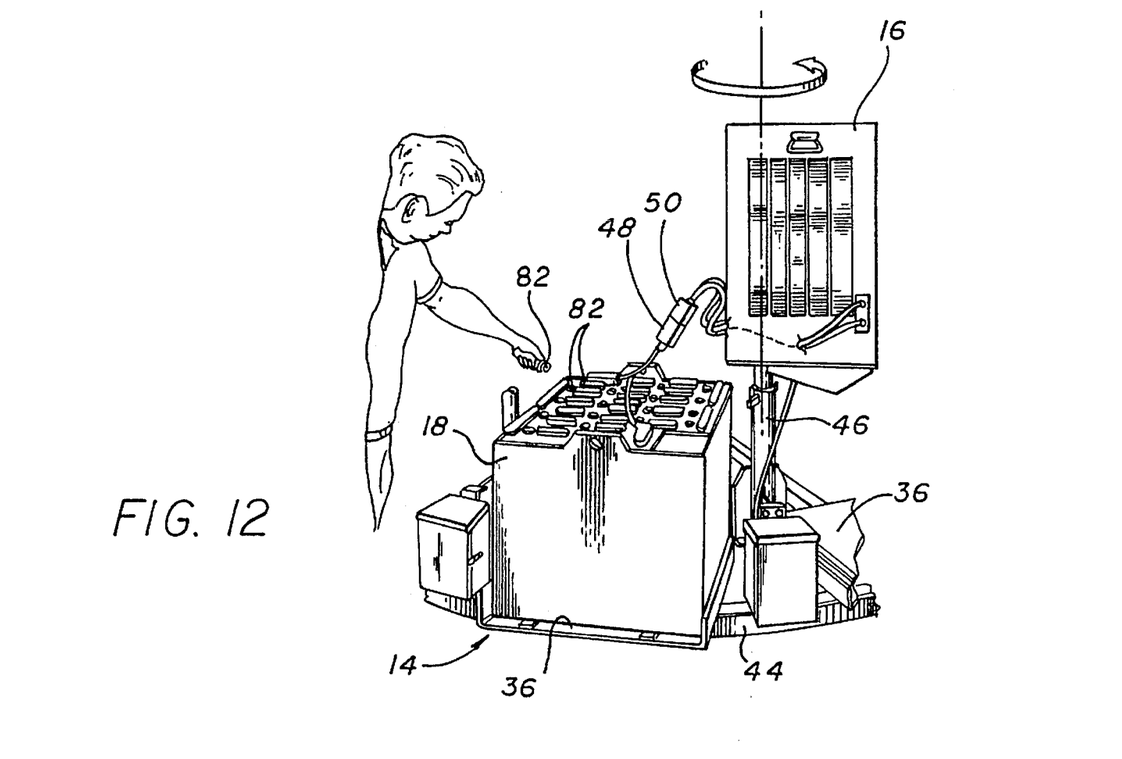
FIG. 12 is a fragmented perspective illustrating access to the cells of a battery being recharged.

Each charging station 14 also includes a battery charger 16 shown mounted on a post 46 extending upwardly from the turntable frame 28. The battery charger 16 includes appropriate means for recharging a battery 18 on the associated platform 36, when said battery 18 is connected to the charger by means of connector fittings 48 and 50 (FIG. 12). The charging stations 14 are designed to recharge the batteries in course of stepwise rotational index transfer of the batteries through a circular path upon turntable rotation. In this regard, the battery chargers 16 must be suitably connected to an appropriate power source by means of a slip ring or similar conductive connection (not shown) of a type well-known to persons skilled in the art.

Figure 1:
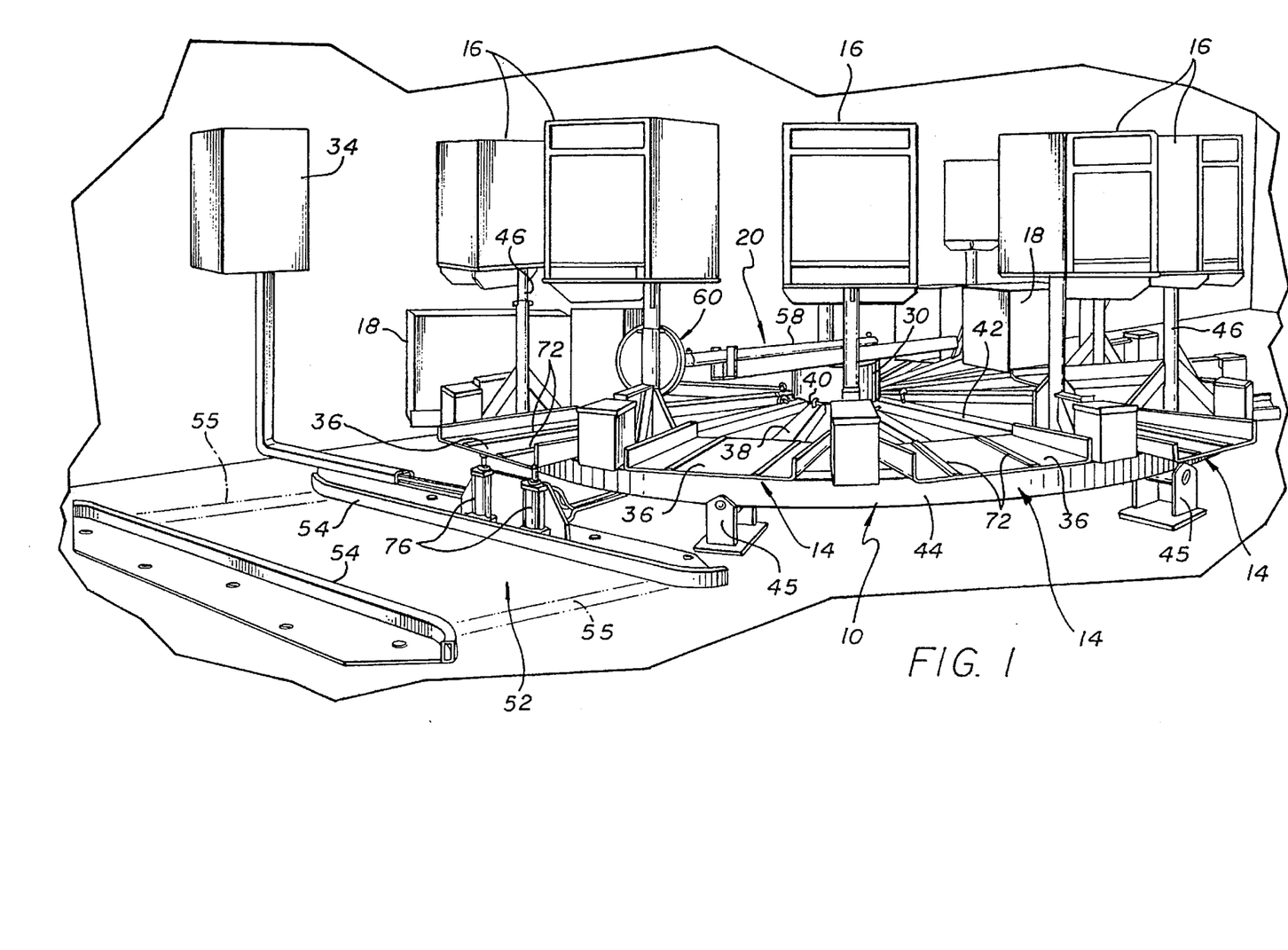
FIG. 1 is a perspective view of a battery recharger turntable in accordance with the novel features of the invention.
Figure 2:
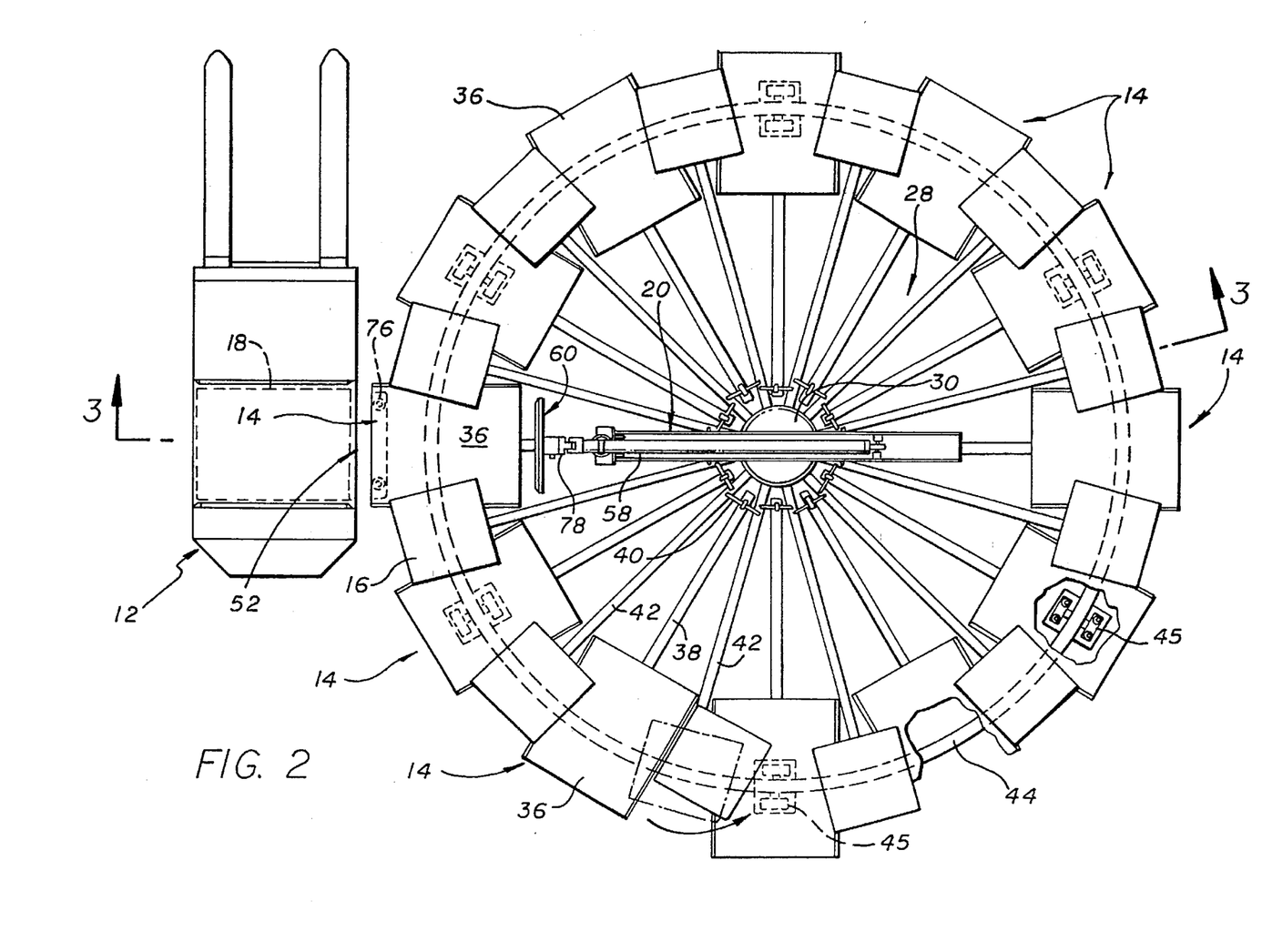
FIG. 2 is a top plan view of the turntable shown in FIG. 1, with a battery powered forklift truck parked alongside the turntable at a transfer position.

A transfer position referred to by arrow 52 in FIGS. 1 and 2 is defined at one side of the turntable 10. Battery exchange between the turntable 10 and a vehicle 12 occurs at this transfer position 52. In particular, a vehicle 12 with a depleted or near-depleted battery 18 is driven to and parked at the transfer position 52 preparatory to the battery exchange process. A suitable curb structure 54 (FIG. 1) and/or park alignment markings 55 are provided at the transfer position 52 to ensure that the vehicle 12 is driven to and parked at the correct location.

At the transfer position 52, the depleted or near-depleted battery 18 within the vehicle 12 is exposed for transfer to a charging station 14 on the turntable 10. In this regard, the battery is accessed typically by pivoting the vehicle seat 26 to an out-of-the-way position (FIG. 5), and then disconnecting the battery fitting 48 from a mated fitting 53 used to couple the battery with a vehicle drive motor or motors (not shown). The battery 18 is thus freely exposed for horizontal or lateral transfer to the turntable 10.

Figures 8, 9, 10:
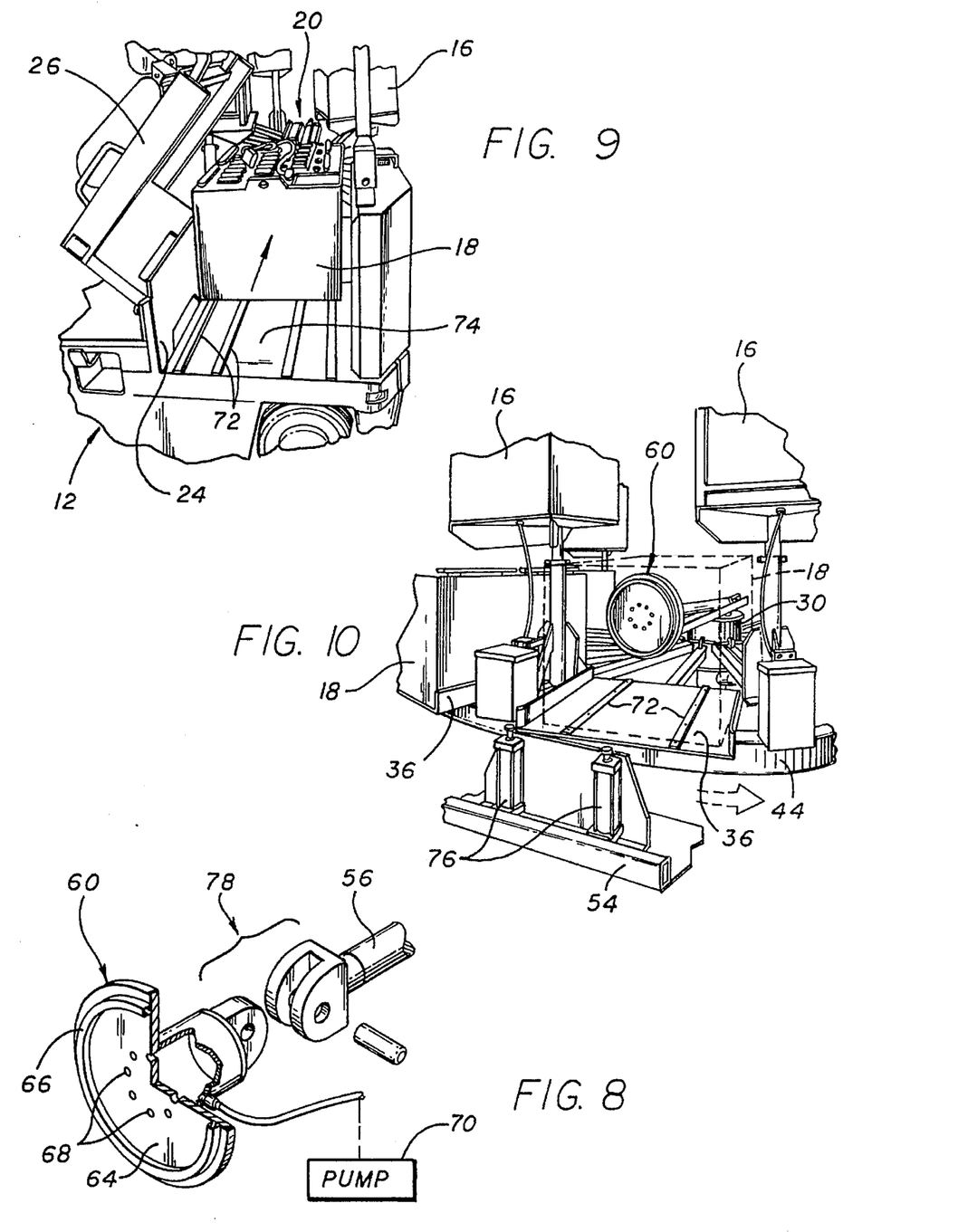
FIG. 8 is an exploded perspective view of a vacuum suction head forming a portion of the push-pull ram.
FIG. 9 is a fragmented perspective view showing further details of battery transfer to the turntable.
FIG. 10 is a fragmented perspective view depicting rotational turntable movement to move a depleted battery from the transfer position and to move a recharged battery to the transfer position.

A charging station 14 with an empty support platform 36 is disposed at the transfer position 52, awaiting battery transfer from the vehicle. The transfer mechanism 20 comprises a push-pull ram 56 which may be powered by a hydraulic cylinder 58 to advance a vacuum suction head 60 into engagement with an exposed side wall 62 of the battery 18 within the vehicle battery compartment 24. The vacuum suction head 60 comprises a relatively flat plate 64 circumscribed by a peripheral gasket 66 and including an array of vacuum ports 68 (FIG. 8) through which a vacuum can be drawn by means of a vacuum pump 70 or the like.

Figure 11:
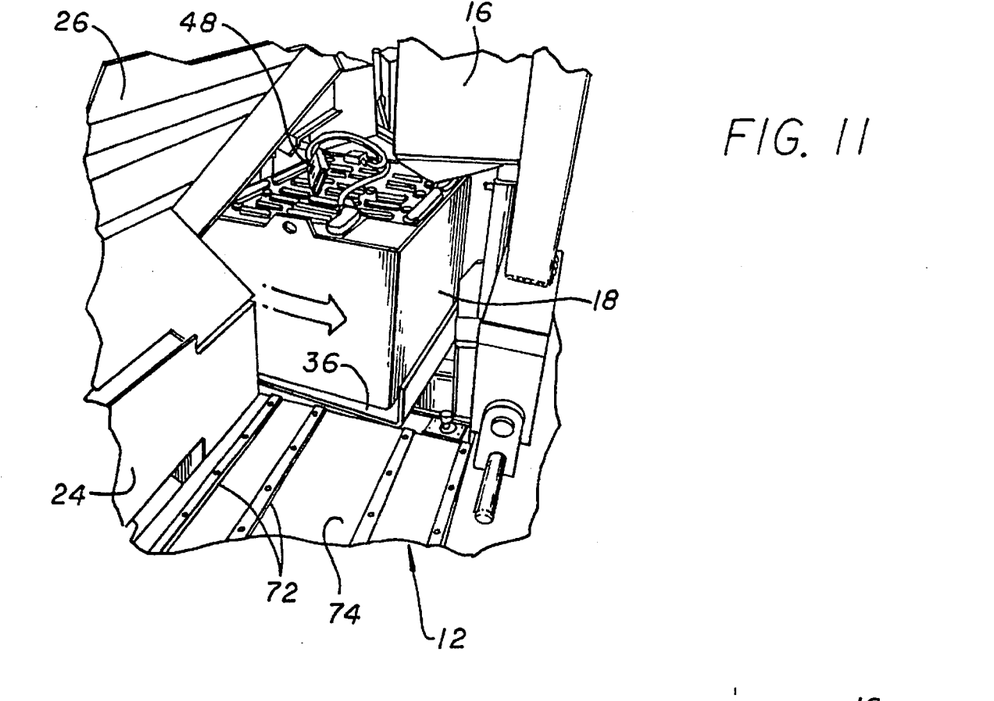
FIG. 11 is a fragmented perspective view showing further turntable rotation to deliver a recharged battery to the transfer position.

The push-pull ram 56 is mounted from the turntable hub 30 in a stationary position located at the battery transfer position 52. In other words, the ram 56 and the associated vacuum suction head 60 remain with the transfer position 52, and do not rotate with the turntable frame 28 or the charging stations 14 thereon. Advancement of the ram 56 displaces the vacuum suction head 60 through the space above an empty support platform 36 (FIG. 3) at the transfer position, in order to move the head 60 into engagement with the exposed side wall 62 of the battery 18. A vacuum is then drawn by the pump 70 (FIG. 8), and the push-pull ram 56 is retracted to draw the battery 18 from the vehicle onto the support platform 36 (FIGS. 4–8). Relatively low friction slide tracks 72 are conveniently mounted on the platform 36 and on the floor 74 (FIGS. 9 and 11) of the battery compartment 24 to facilitate low friction sliding transfer of the battery 18.

The support platform 36 at the transfer position 52 is elevationally adjustable to insure substantial horizontal alignment of the platform with the battery compartment floor 74. In this regard, this elevational adjustment is necessary or desirable to accommodate variations in the vertical position of the battery compartment floor 74, wherein such variations are attributable to vehicle tire wear over an extended period of time. This vertical adjustment is accomplished by a pair of hydraulic lift cylinders 76 for engaging and lifting the outer edge of the support platform 36 within a short range of movement, as viewed in FIGS. 4, 7 and 10. When the battery 18 is drawn by the head 60 onto the platform 36, the lift cylinders 76 are retracted to return the platform to its normal position rested on the frame rim 44. A pivot connection 78 (FIG. 8) between the ram 56 and head 60, in combination with a resilient vertical support member 80 (FIGS. 3 and 4) are conveniently provided so that the ram 56 can accommodate vertical platform adjustment, without vacuum release of the engaged battery 18.

With the depleted battery 18 drawn fully onto a support platform 36 of a charging station 14, the depleted battery can be connected quickly and easily to the associated charger 16 for battery charging purposes. The head 60 is released and retracted from the battery 18, and the lift cylinders 76 are appropriately lowered as needed to rest the platform 36 on the frame rim 44. The turntable 10 is then indexed by the drive motor 32 through a single step, to move the next charging station 14 in sequence to the transfer position 52. Said next station in sequence carries a battery 18 which has been recharged by the associated battery charger 16 in the course of a full revolution of the turntable, and thus is ready for installation onto the vehicle 12. Specifically, the recharged battery 18 at the transfer position 52 is pushed by the head 60, in response to extension of the push-pull ram 56, for slidably transferring the recharged battery 18 into the open battery compartment 24 of the vehicle 12 in a manner similar to the battery removal sequence shown in FIGS. 3–7 and 9. Appropriate vertical adjustment of the station platform 36 may be necessary or desirable, to ensure smooth sliding battery transfer. The push-pull ram 56 is then retracted. The recharged battery can be connected to the vehicle drive motors quickly and easily and the seat 26 returned to its normal position whereby the vehicle 12 can be driven off and returned to service. The now-empty charging station 14 remains at the transfer position, awaiting the next vehicle with a depleted battery at the transfer position.

As shown in FIG. 12, the battery charger 16 at each charging station 14 is conveniently rotatable to an out-of-the-way position for easy access to the top of a battery 18 at that station. In this regard, occasional battery service may be required, such as removal of cell caps 82 so that battery cells can be refilled as needed. Rotation of the charger 16 to the out-of-the-way position permits this service activity, without interrupting normal turntable recharging operation.

The battery recharger turntable of the present invention thus provides a system and method for quickly and easily exchanging depleted and recharged batteries relative to battery powered vehicles such as forklift trucks. The turntable 10 is adapted to carry and recharge a plurality of the batteries 18, wherein a substantially recharged battery is available virtually on continuous basis. The turntable 10 may thus service a fleet of forklift trucks or the like, with rapid and safe battery exchange so that the vehicles may remain in service substantially on a continuous basis.

A variety of further modifications and improvements to the recharger turntable 10 of the present invention will be apparent to those skilled in the art. Accordingly, no limitation on the invention is intended by way of the foregoing description and accompanying drawings, except as set forth in the appended claims.

What is claimed is:

1. Battery recharger apparatus for use in recharging batteries of a battery powered vehicle, said recharger apparatus comprising:

a movable frame including a plurality of charging stations each including a battery support platform and charger means for recharging a battery on said platform;

drive means for moving said frame to move said charging stations one at a time to a transfer position;

means for elevationally adjusting the platform of the charging station at said transfer position; and a transfer mechanism at said transfer position for slidably transferring a depleted battery within a battery powered vehicle parked at said transfer position from the vehicle and onto the platform of a charging station at said transfer position whereby said depleted battery can be connected to said charger means for recharging, said transfer mechanism being further operable for slidably transferring a recharged battery from the platform of the charging station at said transfer position to the vehicle parked at said transfer position;

said transfer mechanism including means for vacuum drawing a battery from the vehicle at said transfer position onto the platform of the charging station at said transfer position, and for pushing a battery from the platform at said transfer position onto the vehicle at said transfer position.

2. The battery recharger apparatus of claim 1 wherein said frame comprises a rotary turntable having said plurality of charging stations arranged in a circular array about the periphery of said turntable.

3. The battery recharger apparatus of claim 2 wherein said transfer mechanism vacuum means engages and draws a battery from the vehicle at said transfer position in a radial direction relative to said turntable to transfer a battery from the vehicle onto the platform of the charging station at said transfer position, and further wherein said transfer mechanism pushing means engages and pushes a battery from the platform of the charging station at said transfer position in a radial direction relative to said turntable onto the vehicle.

4. The battery recharger apparatus of claim 1 further including park alignment means for indicating correct positioning of the vehicle at said transfer position.

5. A battery recharger turntable for use in recharging batteries transported to said turntable by a vehicle, said recharger turntable comprising:

a turntable frame defining a plurality of battery charging stations arranged in a circular array about the turntable periphery, each of said charging stations including a support platform for receiving and supporting a battery to be recharged;

charger means for connection to batteries carried by said turntable for recharging said batteries;

means defining a transfer position at one side of said turntable in association with one of said charging stations;

means for rotating said turntable frame to move said charging stations in succession to said transfer position; and a transfer mechanism for slidably moving a depleted battery on a vehicle parked at said transfer position from the vehicle onto the platform of said charging station at said transfer position, and for slidably moving a recharged battery from the platform of the charging station at said transfer position onto the vehicle at said transfer position, said transfer mechanism including means for vacuum drawing a battery from the vehicle at said transfer position in a radial direction relative to said turntable onto the platform of the charging station at said transfer position, and for pushing a battery from the platform at said transfer position in a radial direction relative to said turntable onto the vehicle at said transfer position.

6. The battery recharger turntable of claim 5 including means for elevationally adjusting the platform of the charging station at said transfer position.

7. The battery recharger turntable of claim 5 further including park alignment means for indicating correct positioning of the vehicle at said transfer position.

8. The battery recharger turntable of claim 5 wherein the platform of each of said charging station includes relatively low friction slide tracks for slidably supporting a battery.

9. Battery recharger apparatus for use in recharging batteries transported by a vehicle, said recharger apparatus comprising:

a plurality of charging stations each including a battery support platform;

means for recharging batteries carried on the platforms of said charging stations;

means defining a transfer position for parking a vehicle carrying a battery to be recharged; and transfer means for vacuum engagement with and for slidably transferring the battery from the vehicle at said transfer position onto the support platform of one of said charging stations, and for slidably pushing a recharged battery from the support platform of another of said charging stations onto the vehicle at said transfer position.

10. The battery recharger apparatus of claim 9 including means for elevationally adjusting the platform of the charging station at said transfer position.

* * * * *